United States Patent
Abiko et al.

Patent Number: 5,476,713
Date of Patent: Dec. 19, 1995

[54] MAGNETO-OPTICAL RECORDING MEDIUM

[75] Inventors: Toru Abiko; Mari Yoshida; Takashi Kishi; Hiroshi Nakayama, all of Miyagi, Japan

[73] Assignee: Sony Corporation, Tokyo, Japan

[21] Appl. No.: 112,060

[22] Filed: Aug. 26, 1993

Related U.S. Application Data

[63] Continuation of Ser. No. 787,648, Nov. 4, 1991, abandoned.

[30] Foreign Application Priority Data

Nov. 7, 1990 [JP] Japan .................. 2-299938
Aug. 23, 1991 [JP] Japan .................. 3-235610

[51] Int. Cl.$^6$ ........................... G11B 5/66
[52] U.S. Cl. ............ 428/332; 428/336; 428/694 MM; 428/694 ML; 428/694 RE; 428/694 NF; 428/694 XS; 428/694 DE; 428/694 RL; 428/702; 428/704; 428/900; 428/698
[58] Field of Search ................ 428/698, 702, 428/704, 900, 694 ML, 694 RE, 694 NF, 694 XS, 694 DE, 332, 336, 694 MM, 694 RL

[56] References Cited

U.S. PATENT DOCUMENTS 4,661,420  4/1987  Nakamura et al. .............. 428/692

FOREIGN PATENT DOCUMENTS 0233034  8/1987  European Pat. Off. .

Primary Examiner—L. Kiliman
Attorney, Agent, or Firm—Hill, Steadman & Simpson

[57] ABSTRACT

A magneto-optical recording medium having at least two kinds of films consisting of a rare earth metal-transition metal alloy thin film and a dielectric film formed on a substrate. The dielectric film is formed by sputtering a target in an atmosphere containing at least an oxygen gas or a compound gas containing oxygen as one constitutional element. Particularly, the use of a carbon dioxide gas $CO_2$ or a carbon monoxide gas CO provides for an SiCON film rather than an $Si_3N_4$ film. The SiCON film has a refractive index and an absorptivity almost identical with those of the $Si_3N_4$ film, and has a thermal conductivity smaller than that of the $Si_3N_4$ film. As a result, it has been found that the SiCON film is advantageous from the viewpoints of a magnetic field sensitivity and a film thickness.

3 Claims, 3 Drawing Sheets

MAGNETO-OPTICAL RECORDING MEDIUM

This is a continuation of application Ser. No. 07/787,648, filed Nov. 11, 1991, now abandoned.

BACKGROUND OF THE INVENTION

The present invention relates to a magneto-optical recording medium having at least two kinds of films consisting of a rare earth metal-transition metal alloy thin film (which will be hereinafter referred to as RE-TM film) and a dielectric film, and more particularly to a magneto-optical recording medium which can achieve magnetic field modulation recording with a high sensitivity even in a low external magnetic field.

In recent years, there has been proposed a magneto-optical recording system as an overwritable, high-density recording system, in which information is recorded by using a laser beam as a thermal energy source and applying a magnetic field to a perpendicular magnetization film, and this recorded information is read out by using a magnet-optical effect.

It is known that a typical recording material layer of a magneto-optical recording medium to be applied to this magneto-optical recording system is an amorphous alloy thin film to be formed by combining a rare earth metal such as Gd, Tb, Dy, etc. with a transition metal such as Fe, Co, etc., that is, the RE-TM TM film. In particular, TbFeCo film, GdTbFe film, etc. containing Tb as the rare earth metal have a large perpendicular magnetic anisotropy, and researches for practical application thereof have been advanced.

In recent years, there are few cases that the RE-TM film is solely used. In most cases, the RE-TM film is used with a dielectric film and a reflecting film, and they are laminated together to form a multilayer film structure. The most typical film structure is a four-layer structure formed by laminating a lower dielectric film, RE-TM film, upper dielectric film, and reflecting film in this order on a substrate. In the four-layer structure, improvement in C/N is contemplated through multiple reflection by optimization of a film thickness, synergism of a magnetic Faraday effect by utilization of reflection of a transmitted light from the RE-TM film, and enhancement of a Kerr effect by prevention of thermal diffusion to the reflecting film.

The dielectric film is desirably formed of a material having a refractive index n not less than 1.9. For example, $Si_3N_4$ and SiO (both, n=2.0) are often used as the dielectric film in the prior art. In general, the dielectric film of $Si_3N_4$ and SiO is formed by reactive sputtering. For example, the $Si_3N_4$ film is formed by sputtering an Si target in an atmosphere containing an Ar gas and an $N_2$ gas.

Meanwhile, the recording system for the magneto-optical recording medium is classified into a light modulation system and a magnetic field modulation system. In the light modulation system, a weal direct current external magnetic field is always applied, and a laser beam is applied according to an information signal. In the magnetic field modulation system, a laser beam with a constant intensity is always applied, and an external magnetic field is inverted according to an information signal. Although the magnetic field modulation system is somewhat more complex in construction than the light modulation system, the former has an advantage such that overwriting is possible, and high-speed recording matching that of a hard disk for computers is also possible.

However, in effecting the high-speed recording with the magnetic field modulation system, it is essential to enhance a magnetic field sensitivity of the magneto-optical recording medium. The magnetic field modulation system employs a high-frequency magnet as means for applying an external magnetic field, which can invert the magnetic field at a very high speed. However, it is difficult to generate a large external magnetic field by such a magnet. Further, unlike a magnetic recording system, the magnetic field modulation system need not contract a magnetic field, so that a spacing between the medium surface and the magnet can be made larger one or more orders of magnitude than that of the magnetic recording system, but on the other hand, this causes a reduction in effective external magnetic field. Accordingly, it is necessary to improve the magneto-optical recording medium so as to readily generate inversion of magnetization in a low external magnetic field.

As an approach to solve the above problem, there has been conventionally made an attempt to contrive a film forming condition of the RE-TM film or a rare earth metal film to be laminated thereon for the purpose of improvement in corrosion resistance (see Japanese Patent Laid-open Publication No. 1-138640, for example).

However, in further advancing the high-density recording in the future, there is a limit of improvement in the magnetic field sensitivity only by optimizing the film forming condition of the RE-TM film.

SUMMARY OF THE INVENTION

It is accordingly an object of the present invention to provide a magneto-optical recording medium which can exhibit superior recording and reproduction characteristics even in a low external magnetic field.

According to the present invention, there is provided a magneto-optical recording medium having at least two kinds of films consisting of a rare earth metal-transition metal alloy thin film and a dielectric film formed on a substrate. In particular, the magneto-optical recording medium can achieve magnetic field modulation recording with a high sensitivity even in a low external magnetic field.

According to a first aspect of the present invention, the dielectric film is formed by sputtering a target in an atmosphere containing at least an oxygen gas or a compound gas containing oxygen as one constitutional element.

According to a second aspect of the present invention, the dielectric film has a composition of $Si_xC_yO_zN_v$, where x, y, z, and v satisfy the following conditions.

$0.40 \leq x \leq 0.60$ $0.05 \leq y \leq 0.20$ $0.05 \leq z \leq 0.30$ $0.10 \leq v \leq 0.30$ $x+y+z+v=1$ Other objects and features of the invention will be more fully understood from the following detailed description and appended claims when taken with the accompanying drawings.

DETAILED DESCRIPTION OF THE PREFERRED EMBODIMENTS

Figure 1:
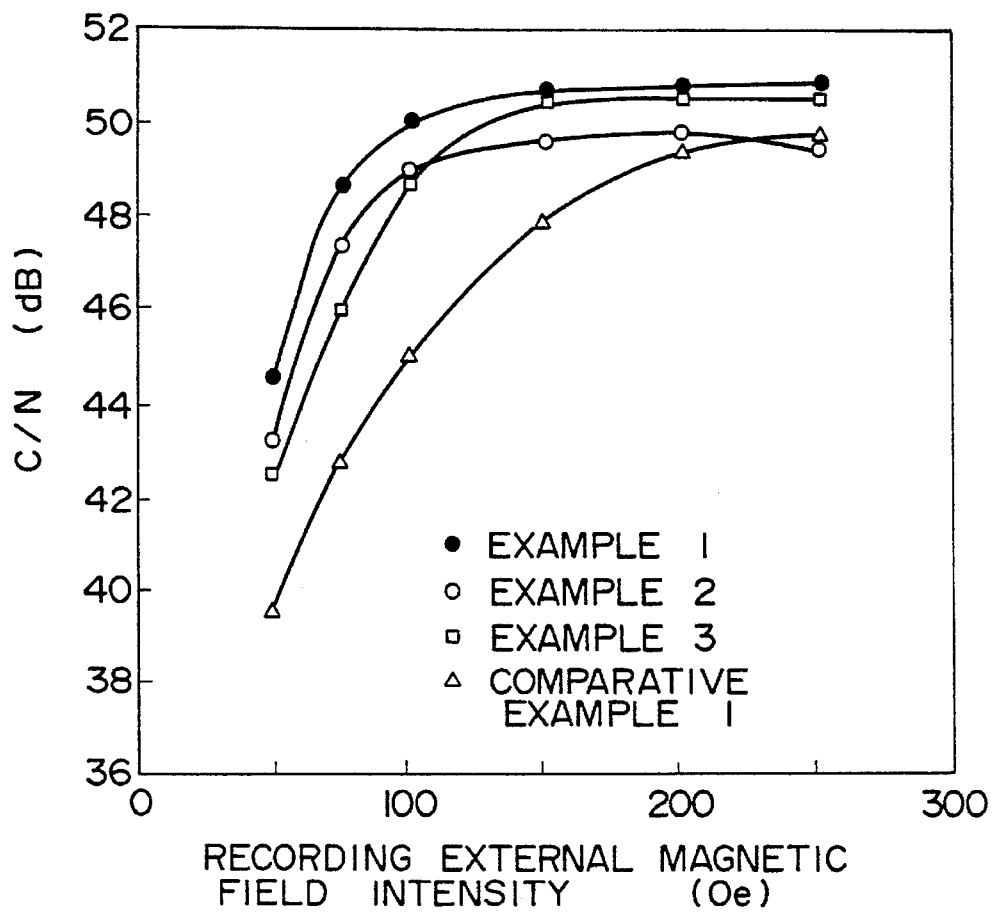
FIG. 1. is a graph illustrating the recording and reproduction characteristics of magneto-optical disks according to some examples to which the first aspect and the second aspect of the present invention are applied, in comparison with the prior art.

The present inventors have closely investigated to achieve the above object, and as the result of investigation, they have found a certain condition where oxygen in any form can act on an RE-TM film and/or a rare earth metal film in forming a dielectric film, thereby improving a magnetic field sensitivity of a magneto-optical recording medium, increasing a film forming rate of the dielectric film, and reducing an internal stress, for example.

The present inventors have also found that not only the magnetic field sensitivity can be improved, but also a film thickness of the dielectric film can be reduced from thermal and optical points of view to further improve a productivity, by selecting an $Si_3N_4$ film as the dielectric film, introducing not only oxygen but also carbon into the $Si_3N_4$ film to form an SiCON film, and setting a composition of the SiCON film to a suitable value.

The magneto-optical recording medium of the present invention has been accomplished on the basis of the above knowledge.

According to a first aspect of the present invention, there is provided in a magneto-optical recording medium having at least two kinds of films consisting of a rare earth metal-transition metal alloy thin film and a dielectric film formed on a substrate; the improvement wherein the dielectric film is formed by sputtering a target in an atmosphere containing at least an oxygen gas or a compound gas containing oxygen as one constitutional element.

According to a second aspect of the present invention, there is provided in a magneto-optical recording medium having at least two kinds of films consisting of a rare earth metal-transition metal alloy thin film and a dielectric film formed on a substrate; the improvement wherein the dielectric film has a composition of $Si_xC_yO_zN_v$, where x, y, z, and v satisfy the following conditions.

$0.40 \leq x \leq 0.60$ $0.05 \leq y \leq 0.20$ $0.05 \leq z \leq 0.30$ $0.10 \leq v \leq 0.30$ $x+y+z+v=1$ In the present invention, it is intended that oxygen acts on the RE-TM film and/or the rare earth metal film which have or has already been formed at the time when the dielectric film is formed. Accordingly, the magneto-optical recording medium of the present invention is required to have a layer construction such that the dielectric film is formed on the upper side of the RE-TM film and/or the rare earth metal film (i.e., on the side far from the substrate). In substance, the above measures are taken in forming the dielectric film to be interposed between the RE-TM film and a reflecting film for the purpose of prevention of thermal diffusion.

The layer construction of the recording medium is considered to be a five-layer structure formed by laminating a lower dielectric film, RE-TM film, rare earth metal film, upper dielectric film, and reflecting film in this order on the substrate. However, in the present invention, the corrosion resistance and the magnetic field sensitivity can be sufficiently ensured by applying oxygen to the RE-TM film only. It is therefore advantageous to omit the rare earth metal film and accordingly form a four-layer structure. Of course, a surface protective film of UV curing resin, electron beam curing resin, etc. may be additionally formed on the reflecting film.

The film thickness of each film constituting the recording medium may be set in a general range. For example, the film thickness of the RE-TM film is normally set to about 15–350 angstroms; the film thickness of the rare earth metal film is set to about 1–30 angstroms; and the film thickness of each of the lower dielectric film and the upper dielectric film is set to about 5–5000 angstroms.

As mentioned above, the present invention is intended to apply oxygen to the RE-TM film. One of techniques for realizing this is to introduce a gas containing oxygen into a sputtering atmosphere in sputtering the dielectric film.

In the first aspect of the present invention, not only a nitrogen gas but also an oxygen gas or a compound gas containing oxygen as one constitutional element (e.g., carbon dioxide gas $CO_2$, carbon monoxide gas $CO$, etc.) is introduced into the sputtering atmosphere in sputtering the dielectric film such as $Si_3N_4$ film with use of an Si target.

In this case, a total gas pressure of the sputtering atmosphere is set to preferably about 2–8 mTorr, and a volumetric ratio of the oxygen gas or the compound gas containing oxygen as one constitutional element to the atmosphere gas is set to preferably about 10–30%.

As any techniques for applying oxygen to the RE-TM film other than the above technique that a gas containing oxygen is applied, it is considered to employ an oxide target. For example, SiO or $SiO_2$ may be employed as the target to form an $Si_3N_4$ film containing oxygen in a usual manner.

Further, in the first aspect of the present invention, the use of a carbon dioxide gas $CO_2$ or a carbon monoxide gas CO provides for an SiCON film rather than the $Si_3N_4$ film. The SiCON film has a refractive index and an absorptivity almost identical with those of the $Si_3N_4$ film, and has a thermal conductivity smaller than that of the $Si_3N_4$ film. As a result, it has been found that the SiCON film is advantageous from the viewpoints of a magnetic field sensitivity and a film thickness.

More specifically, physical values of the $Si_3N_4$ film conventionally used as the dielectric film are such that the refractive index is about 1.9–2.0; the absorptivity is about 0–0.05; and the thermal conductivity is about 0.03 (J/cm.sk). Analyzing these physical values both thermally and optically, the film thickness of each film constituting the magneto-optical recording medium of a four-layer structure, for example, is set in the following manner. That is, the film thickness of the first dielectric film is set to about 1100 angstroms; the film thickness of the RE-TM film is set to about 250 angstroms; and the film thickness of the second dielectric film is set to about 350 angstroms. In this case, if the film thickness of the $Si_3N_4$ film is intended to be reduced for the purpose of improvement in productivity, for example, a solution from an optical point of view (e.g., reflectivity, phase compensation quantity, $R\theta_k$, etc.) exists, but a sufficient solution from a thermal point of view cannot be obtained for the reason such that a temperature gradient of the RE-TM film becomes a broad form to reduce a signal margin for a laser power.

To the contrary, the SiCON film has almost the same refractive index and absorptivity as those of the $Si_3N_4$ film, and has a thermal conductivity of about 60% of that of the $Si_3N_4$ film. Even when the film thickness of the SiCON film is reduced, not only an optical solution can be obtained, but also a sufficient thermal solution can be obtained as if a thick film were present.

In the second aspect of the present invention, the dielectric film has a composition of $Si_xC_yO_zN_v$, and the composition ranges of the constitutional elements Si, C, O, and N are set as follows:

$0.40 \leq x \leq 0.60$ $0.05 \leq y \leq 0.20$ $0.05 \leq z \leq 0.30$ $0.10 \leq v \leq 0.30$ $x+y+z+v=1$ In the above composition, the composition ranges of the constitutional elements Si, C, O, and N are dependent on a balance of optical characteristics, especially, a refractive index n and an absorptivity k. If the composition ranges fall outside the above ranges, a good transparent dielectric film cannot be obtained.

As previously mentioned, the use of the SiCON film as the dielectric film enables the film thickness to be reduced. In the magneto-optical recording medium of a four-layer structure according to the present invention, the film thickness of the first dielectric film is set to preferably 600–900 angstroms; the film thickness of the RE-TM film is set to preferably 200–250 angstroms; and the film thickness of the second dielectric film is set to preferably 300 angstroms or less.

The film thickness of the first dielectric film is largely influenced by the film thickness of the second dielectric film. However, if the film thickness of the first dielectric film is less than 600 angstroms, it is difficult to ensure a sufficient value of $R\theta_k$ irrespective of any set value of the film thickness of the second dielectric film. Further, an upper limit of the film thickness of the first dielectric film is not especially defined. However, if the film thickness of the first dielectric film is more than 900 angstroms, it is of no significance in view of the purpose of improving a productivity by reducing the film thickness.

On the other hand, the film thickness of the second dielectric film is required to be set to an optimum value according to the film thickness of the first dielectric film since the solution is dependent on the film thickness of the first dielectric film. However, the film thickness of the second dielectric film is set to preferably 300 angstroms or less in consideration of a productivity.

Further, the film thickness of the RE-TM film is arbitrary. However, if the film thickness of the RE-TM film is too large, deterioration of the characteristics appears. In contrast, if it is too small, a reliability is reduced. Accordingly, the film thickness of the RE-TM film is set to preferably 200–250 angstroms.

While the reason of improvement of the magnetic field sensitivity is not completely apparent, it is roughly considered as follows:

In the first aspect of the present invention, owing to the fact that the oxygen gas or the compound gas containing oxygen as one constitutional element is contained in the sputtering atmosphere in forming the dielectric film, it is considered that a surface layer of the RE-TM film as a base for the formation of the dielectric film in case of the four-layer structure, or the rare earth metal film as the base or both the rare earth metal film and the surface layer of the RE-TM film in case of the five-layer structure is/are changed into a dense, thin oxide layer, and this oxide layer functions as a barrier against entry of oxygen from the outside or against an interfacial reaction.

On the other hand, in the second aspect of the present invention, the magnetic field sensitivity is improved, and additionally, owing to the fact that the refractive index and the absorptivity of the SiCON film as the dielectric film are almost identical with those of the $Si_3N_4$ film and that the thermal conductivity of the SiCON film is about 60% of that of the $Si_3N_4$ film, not only an optical solution can be surely obtained, but also a thermal solution can be obtained as if a thick film were present even when the film thickness of the SiCON film is reduced. Accordingly, the film thickness of the magneto-optical recording medium can be reduced by adopting a reduced film thickness of the dielectric film.

The invention will be more clearly understood with reference to the following examples:

EXAMPLE 1

In preparing a magneto-optical disk of a five-layer structure, an SiN film containing C and O as the dielectric film was formed by sputtering an Si target in an atmosphere containing $CO_2$.

Figure 2:
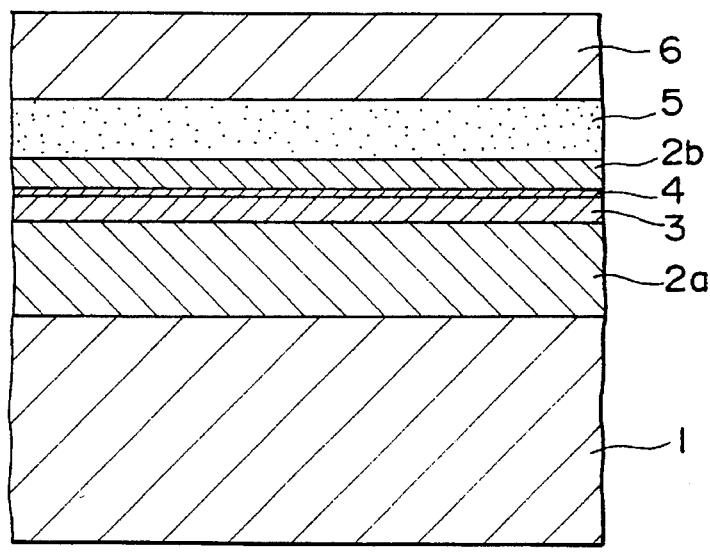
FIG. 2 is a schematic sectional view illustrating a construction of the magneto-optical disk prepared according to the present invention.

FIG. 2 shows a schematic construction of the magneto-optical disk of the five-layer structure prepared in this example. It is assumed in the construction of this magneto-optical disk that recording and reproduction are carried out from the side of a substrate 1. The magneto-optical disk shown is formed by laminating on the substrate 1 of polycarbonate a first dielectric film 2a of $Si_3N_4$, an RE-TM film 3 of TbFeCo alloy, a rare earth metal film 4 of Tb, a second dielectric film 2b of $Si_3N_4$, a reflecting film 5 of Al, and a protective film 6 of UV curing resin in this order.

The magneto-optical disk was prepared in accordance with the following procedure.

To form the first dielectric film 2a, the RE-TM film 3, the second dielectric film 2b, the rare earth metal film 4, and the Al reflecting film 5 by a continuous process, four kinds of targets consisting of an Si target, Tb target, FeCo alloy target, and Al target as well as the substrate 1 were set in a chamber of a four-element sputtering apparatus. Subsequently, the chamber was evacuated to set a background vacuum degree to $1.0 \times 10^{-3}$ mTorr ($1.33 \times 10^{-4}$ Pa).

Then, high-frequency reactive sputtering was carried out with use of the Si target under the conditions of 80 SCCM of Ar flow, 7 SCCM of $N_2$ flow, 5 SCCM of $CO_2$ flow, 3 mTorr (0.4 Pa) of gas pressure, and 2 kW of applied electric power. As a result, the first dielectric film 2a having a film thickness of 1100 angstroms was formed on the polycarbonate substrate 1.

Then, direct current simultaneous two-element sputtering was carried out with use of the FeCo alloy target and the Tb target. As a result, the RE-TM film 3 having a composition of $Tb_{19.4}Fe_{76.5}Co_{4.1}$ and a film thickness of 250 angstroms was formed on the first dielectric film 2a.

Then, direct current sputtering was carried out with use of the Tb target. As a result, the rare earth metal film 4 having a film thickness of 5 angstroms was formed on the RE-TM film 3.

Then, high-frequency reactive sputtering was carried out again with use of the Si target under the same conditions as those for the first dielectric film 2a. As a result, the second dielectric film 2b having a film thickness of 350 angstroms was formed on the rare earth metal film 4. Further, direct current sputtering was carried out with use of the Al target to form the Al reflecting film 5 having a film thickness of 600 angstroms on the second dielectric film 2b.

Finally, UV curing resin was spin-coated on a surface of the Al reflecting film 5, and was cured by exposure of a mercury lamp to form the protective film 6 on the Al reflecting film 5. Thus, the magneto-optical disk was prepared.

EXAMPLE 2

A magneto-optical disk was prepared in the same manner as that in Example 1 with the exception that the forming conditions of the first dielectric film 2a and the second dielectric film 2b were changed to 3 mTorr of gas pressure, 70 SCCM of Ar flow, 10 SCCM of $N_2$ flow, 2.7 SCCM of $CO_2$ flow, 2.5 SCCM of $CH_4$ flow, and 2 kW of applied electric power.

EXAMPLE 3

A magneto-optical disk was prepared in the same manner as that in Example 1 with the exception that the forming conditions of the first dielectric film 2a and the second dielectric film 2b were changed to 3 mTorr of gas pressure, 80 SCCM of Ar flow, 16 SCCM of $N_2$ flow, 4 SCCM of $O_2$ flow, and 2 kW of applied electric power.

Comparison 1

For comparison, a dielectric film of $Si_3N_4$ was formed by applying the conventional conditions of the atmosphere gas. In this comparison, the construction of the magneto-optical disk prepared and the forming method for each film except the dielectric film are similar to those in Example 1.

The first dielectric film 2a and the second dielectric film 2b were formed by high-frequency reactive sputtering under the conditions of 3 mTorr of gas pressure, 75 SCCM of Ar flow, 25 SCCM of $N_2$ flow, and 2 kW of applied electric power with use of an Si target. In this system, no oxygen is supplied from any of the sputtering atmosphere and the Si target.

Subsequently, a recording and reproduction test by a magnetic field modulation system was carried out on all the magneto-optical disks prepared in Examples 1 to 3 and Comparison 1. That is, recording was carried out under the conditions of ±50–250 Oe of recording external magnetic field intensity, 1.4 m/sec of linear velocity, 750 kHz of recording signal frequency, and 4.5 mW of semiconductor laser output. Thereafter, reproduction was carried out under the condition of 0.6 mW of semiconductor laser output. Then, frequency spectrum analysis was carried out in a resolution band of 10 kHz over the entire frequency band of a reproduced waveform to obtain C/N.

The test results were shown in FIG. 1. Referring to FIG. 1, the axis of ordinate represents the C/N (dB), and the axis of abscissa represents the recording external magnetic field intensity (Oe). The plot of marks ● corresponds to Example 1; the plot of marks ○ corresponds to Example 2; the plot of marks □ corresponds to Example 3; and the plot of marks Δ corresponds to Comparison 1. As apparent from FIG. 1, when the recording external magnetic field intensity is high such as at ±250 Oe, almost the same C/N is achieved in Examples 1 to 3 and Comparison 1, while when the magnetic field intensity is low, the C/N in each of Examples 1 to 3 is superior to that in Comparison 1, and there is a tendency that the C/N in each of Examples 1 to 3 is saturated in the range of ±100–150 Oe. That is to say, even when the recording external magnetic field intensity is reduced to about 40–60% of the conventional value, the magneto-optical recording medium according to the present invention can exhibit a sufficient recording and reproduction characteristic in practical use. In other words, it is apparent that the magnetic field sensitivity can be increased about 1.7 to 2.5 times the conventional value.

Further, concerning a film forming rate and an internal stress, Example 1 was compared with Comparison 1. In Example 1, the film forming rate of each of the first dielectric film 2a and the second dielectric film 2b was 100 angstroms/min, and the internal stress of each film was $3.30 \times 10^9$ dyn/cm$^2$. In Comparison 1, the film forming rate was 70 angstroms/min, and the internal stress was $5.53 \times 10^9$ dyn/cm$^2$. Accordingly, it is possible to increase the film forming rate and reduce the internal stress according to the present invention.

EXAMPLE 4

In this example, an SiCON film was used as the dielectric film, and the film thickness of the magneto-optical disk was set to a smaller value than that using an ordinary $Si_3N_4$ film.

First, similarly to Example 1, sputtering was carried out in an atmosphere containing $CO_2$ to form the SiCON film as the dielectric film, thus preparing the magneto-optical disk including the SiCON film as the dielectric film. However, the magneto-optical disk thus prepared has a four-layer structure excluding the rare earth metal film 4.

The SiCON film constituting each of the first and second dielectric films 2a and 2b formed in this example proved to have a composition of 46.3 at. % of Si, 8.5 at. % of C, 26.6 at. % of O, and 8.6 at. % of N.

Further, this SiCON film proved to have a thermal conductivity λ of 0.016 J/cmsk, which is lower than the value (0.026 J/cmsk) of the ordinary $Si_3N_4$ film.

Figure 3:
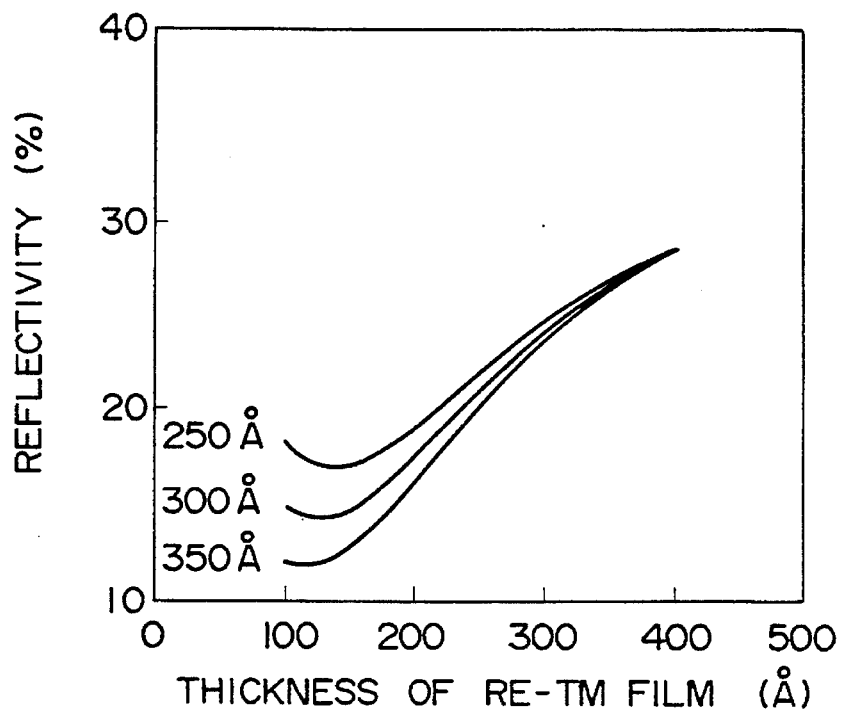
FIG. 3 is a characteristic graph illustrating a change in reflectivity with a change in film thickness of the RE-TM film and the second dielectric film in the case that the dielectric film is an SiCON film.
Figure 4:
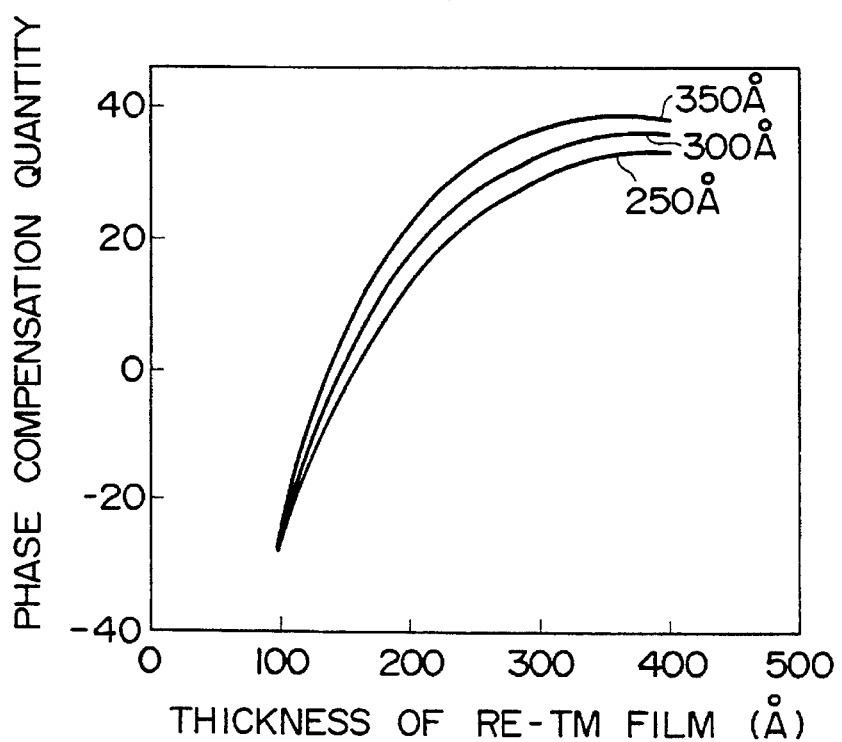
FIG. 4 is a characteristic graph illustrating a change in phase compensation quantity.
Figure 5:
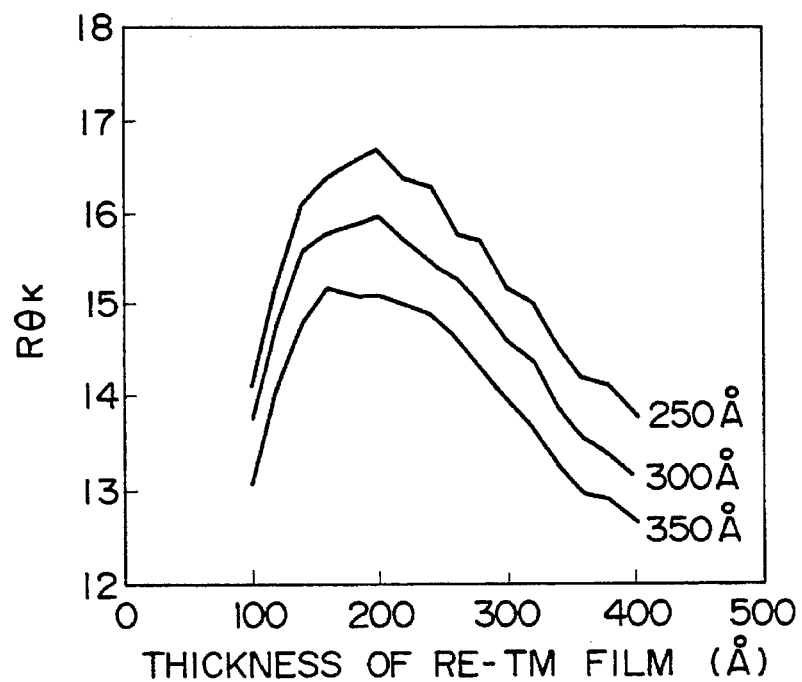
FIG. 5 is a characteristic graph illustrating a change in $R\theta_k$.

With the film thickness of the first dielectric film 2a *fixed to* 800 angstroms and the film thicknesses of the RE-TM film 3 and the second dielectric film 2b changed, fluctuations in the reflectivity, the phase compensation quantity and $R\theta_k$ were examined. The results of examination are shown in FIGS. 3, 4 and 5.

It is appreciated from these results that the smaller the film thickness of the second dielectric film 2b, the more each characteristic is improved.

On the basis of the above test results, a temperature gradient of the RE-TM film 3 (i.e., a temperature gradient against a distance from a spot center when applying the same laser spot) and a recording power margin were measured with the film thickness of each film set to 900 angstroms for the first dielectric film 2a, 200 angstroms for the RE-TM film 3,250 angstroms for the second dielectric film 2b, and 550 angstroms of the Al reflecting film 5 (such a construction of the film thicknesses will be hereinafter expressed as 900/200/250/550).

Figure 6:
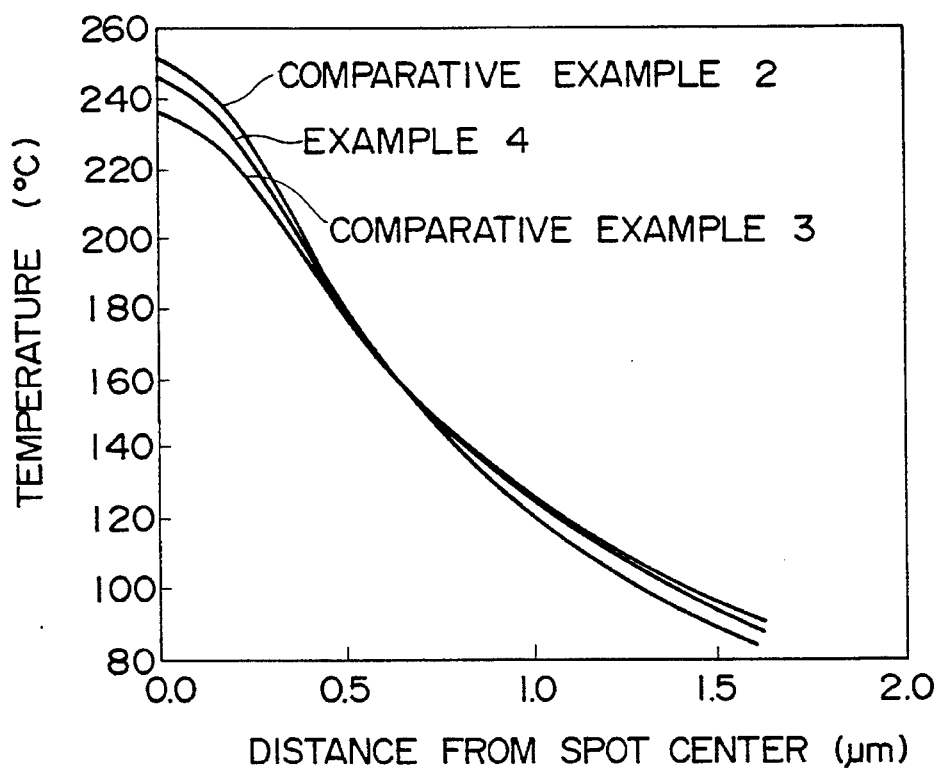
FIG. 6 is a characteristic graph illustrating a temperature gradient of a magneto-optical disk including an SiCON film as the dielectric film in comparison with the conventional magneto-optical disks each including an ordinary $Si_3N_4$ film.

The temperature gradient measured is shown in FIG. 6, and the recording power margin measured is shown in Table 1. For comparison, the temperature gradient and the recording power margin in the magneto-optical disk including the ordinary $Si_3N_4$ film as the dielectric film were also measured. As the magneto-optical disk including the $Si_3N_4$ film as the dielectric film, two kinds of magneto-optical disks having different constructions of film thicknesses, that is, 1100/230/350/550 (Comparison 2) and 900/200/250/550 (Comparison 3) were adopted.

TABLE 1

| | Dielectric Film | Construction of Film Thickness (angstroms) | Measured Margin (Central Power) |
|---|---|---|---|
| Example 4 | SiCON Film | 900/200/250/550 | ±37.1% (4.38 mW) |
| Comparison 2 | $Si_3N_4$ Film | 1100/230/350/550 | ±37.8% (4.83 mW) |
| Comparison 3 | $Si_3N_4$ Film | 900/200/250/550 | ±33.8% (4.58 mW) |

Referring to FIG. 6, it is appreciated that the temperature gradient in Comparison 3 using the $Si_3N_4$ film having a reduced film thickness becomes a broad form. To the contrary, it is appreciated that the temperature gradient in Example 4 using the SiCON film is satisfactory as similarly to Comparison 2 using the $Si_3N_4$ film having an increased film thickness.

Also regarding the recording power margin shown in Table 1, the same evaluation as above is permitted. That is, the power margin in Comparison 3 using the $Si_3N_4$ film having a reduced film thickness is reduced. To the contrary, the power margin in Example 4 using the SiCON film becomes substantially the same as that in Comparison 2 using the $Si_3N_4$ film having an increased film thickness.

Having thus described some examples of the present invention, it is to be understood that the present invention is not limited to the examples, but various modifications of material, size, shape, etc. may be made without departing from the scope of the present invention. For example, the form of the magneto-optical recording medium according to the present invention is not limited to the disk mentioned above, but any other forms such as card, tape, drum, etc. may be adopted.

As apparent from the above description, the present invention can effectively improve a magnetic field sensitivity of a magneto-optical recording medium, increase a film forming rate of a dielectric film, and reduce an internal stress of the dielectric film by a very simple method such that an inexpensive, safe gas is slightly added into a conventional sputtering atmosphere in forming the dielectric film, or an oxide target is used. Such a magneto-optical recording medium can exhibit superior practical characteristics also in case of carrying out magnetic field modulation recording in a low external magnetic field.

Further, especially in the case of using an SiCON film as the dielectric film to be formed by introduction of carbon dioxide or the like, a film thickness of a magneto-optical recording medium can be reduced. Additionally, a rare earth metal film can be omitted. It is therefore very advantageous in respect of productivity.

What is claimed is:

1. A magneto-optical recording medium consisting of a substrate, a first dielectric film formed on the surface of said substrate, a rare earth metal-transition metal alloy film formed on said first dielectric film, a rare earth film formed on said rare earth metal-transition metal alloy film, a second dielectric film formed on said rare earth film and, a reflecting film formed on said second dielectric film, and said first and second dielectric films have a composition of $Si_xC_yO_zN_v$, where x, y, z, and v satisfy the following conditions:

$0.40 \leq x \leq 0.60$ $0.05 \leq y \leq 0.20$ $0.05 \leq z \leq 0.30$ $0.10 \leq v \leq 0.30$ $x+y+z+v=1$.

2. The magneto-optical recording medium according to claim 1, wherein said first and second dielectric film are formed by sputtering a silicon target in an atmosphere containing a gas composed of oxygen and carbon and a nitrogen gas.

3. The magneto-optical recording medium according to claim 1, wherein said first dielectric film has thickness of 600–900 angstroms and said second dielectric film has a thickness of 250 to 350 angstroms.

\* \* \* \* \*